US006754657B2

(12) United States Patent
Lomet

(10) Patent No.: US 6,754,657 B2
(45) Date of Patent: Jun. 22, 2004

(54) TIME STAMPING OF DATABASE RECORDS

(75) Inventor: David Bruce Lomet, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 497 days.

(21) Appl. No.: 09/939,180

(22) Filed: Aug. 24, 2001

(65) Prior Publication Data

US 2003/0055807 A1 Mar. 20, 2003

(51) Int. Cl.[7] .............................................. G06F 17/30
(52) U.S. Cl. ......................... 707/8; 707/201; 707/203
(58) Field of Search ................................. 707/8, 103 R, 707/201, 204, 203, 2, 4; 718/101; 709/213; 717/100; 714/6; 345/619

(56) References Cited

U.S. PATENT DOCUMENTS

| | | | | | |
|---|---|---|---|---|---|
| 5,212,788 | A | * | 5/1993 | Lomet et al. | 707/201 |
| 6,148,308 | A | * | 11/2000 | Neubauer et al. | 707/203 |
| 6,158,044 | A | * | 12/2000 | Tibbetts | 717/100 |
| 6,324,535 | B1 | * | 11/2001 | Bair et al. | 707/4 |
| 6,584,477 | B1 | * | 6/2003 | Mosher, Jr. | 707/204 |

OTHER PUBLICATIONS

Jensen, C.S. Snodgrass, R.T. Soo, M.D. Extending existing dependency theory to temporal databases; Dept. of Math & Comput. Sci., Aalborg Univ. , Denmark; Knowledge and Data Engineering, IEEE Transactions on Publication Date: Aug. 1996, vol.: 8 , I.*

Dyreson, C.E. Snodgrass, R.T. ; Valid–time indeterminacy Dept. of Comput. Sci., Arizona Univ., Tucson, AZ , USA; This paper appears in: Data Engineering, 1993. Proceedings. Ninth International Conference ; Publication Date: Apr. 19–23, 1993; Vien.*

(List continued on next page.)

*Primary Examiner*—Diane D. Mizrahi
(74) *Attorney, Agent, or Firm*—Watts Hoffmann Co., L.P.A.

(57) ABSTRACT

A method of assigning timestamps to data items processed by a transaction. The method sets initial upper and lower limits for a transaction timestamp that will be applied to data items processed by the transaction if the transaction does not abort. The upper and lower limits are incrementally updated as data items are processed and time intervals are requested by the transaction. The lower limit is incrementally updated as data items are processed to ensure that write-write, read-write and write-read conflicts are avoided. A transaction timestamp is selected that is greater than the lower limit, but less than the upper limit.

46 Claims, 7 Drawing Sheets

OTHER PUBLICATIONS

"The consensus Glossary of Temproal Database Concepts-"–Feb. 1998 Version, Christian S. Jensen et al., pp. 367–405.
"Using Timestamping to Optimize Two Phase Commit", David Lomet, Proceedings of the PDIS Conference, Jan. 1993, pp. 48–55.
"On the Semantics of 'Current–Time' in Temporal Databases", Marcelo Finger and Peter McBrien, pp. 324–337, In 11th Brazilian Symposium on Databases, 1996.
"The Design of the Postgres Storage System", Michael Stonebraker, Proceedings of the 13th VLDB Conference, Brighton, 1987, pp. 289–300.
"The Implementation of POSTGRES", Michael Stonebraker, Lawrence A. Row and Michael Hirohama, IEEE TKDE, vol. 2, No. 1, Mar. 1990, pp. 125–142.
"Effective Timestamping in Databases", Kristian Torp, Christian S. Jensen and Richard T. Snodgrass, VLDB Journal No. 8, 1999, pp. 267–288.
"Temporal and Real–Time Databases: A Survey", Gultekin Ozsoyoglu and Richard T. Snodgrass, IEEE TKDE, vol. 7, No. 4, Aug. 1995, pp. 513–532.
"Temporal Data Management", Christian S. Jensen and Richard T. Snodgrass, IEEE TKDE, vol. 11, No. 1, Jan./Feb. 1999, pp. 36–44.
"Implementation of Transaction and Concurrency Control Support in a Temporal DBMS", Costas Vassilakis, Nikos Lorentzos and Panagiotis Georgiadis, Information Systems, vol. 23, No. 5, pp. 335–350, 1998.
"On the Semantics of 'Now' in Databases", James Clifford et al., ACM TODS, vol. 22, No. 2, Jun. 1997, pp. 171–214.
"Concurrency Control and Recovery in Database Systems", Bernstein, Hadzilacos and Goodman, pgs. preface iii–x, 1–112, 143–166, 178–179, 217–220 and 226–234, copyright 1987.
Y. Wu, S. Jajodia and X.S. Wang, "Temporal Database Bibliography Update", 43 pages, 1998.
"Timestamping After Commit", by Betty Salzberg, pp. 160–167, dated 1994.
"Transaction Processing: Concepts and Techniques", by Jim Gray and Andreas Reuter, pp. 375–489, dated 1993.

* cited by examiner

TIME STAMPING OF DATABASE RECORDS

FIELD OF THE INVENTION

The present invention concerns temporal databases and, more particularly, relates to time stamping of data items associated with a transaction.

BACKGROUND ART

A conventional database relation contains sets of records. Insertions, updates and deletions occur over time. It is frequently important to retain a perfect record of past database states. In many applications, such as financial, banking, insurance and medical applications it is desirable to maintain a database that can access not only the current set of records, but also a set of records that was current at a specified time. For example, the practice in financial applications is for accountants to correct errors, not by using an eraser, but by posting compensating transactions to the books. A bank must be able to determine the balance of a customer's account as of a certain day. In medical applications, the basis on which decisions were made are documented to guard against malpractice lawsuits.

A database having transaction time support allows not only the current state of the database to be accessed, but also previous states of the database to be accessed. A transaction time supported database provides accountability or traceability of the database records, which is important in databases used in financial, insurance, medical and other applications.

A transaction time relation consists of a set of data items, which may be thought of as a set of records. A start time $d.TT^s$ and an end time $d.TT^e$ are maintained by the system for each data item d. The start time $d.TT^s$ and the end time $d.TT^e$ define the time interval ($d.TT^s$, $d.TT^e$) during which each data item d was part of the current database state. This is a semi-open interval that includes $d.TT^s$ but excludes $d.TT^e$, ensuring that a data item never has more than one value at any time. The start time $d.TT^s$ records the time when the data item d became part of the current state of the database and the end time $d.TT^e$ records when the data item d ceased to be part of the current state of the database.

A transaction that inserts the data item d sets the start time d, also referred to a write timestamp, $TT^s$ to the current time $t_{current}$. The insertion sets the end time $d.TT^e$ to a variable now that is continuously updated to the current time. The data item having a start time $d.TT^s$ and an end time $d.TT^e$ set to the variable now is a current data item d within the database. The data item d remains a current data item until the data item d is explicitly deleted by a delete or update transaction. A transaction that deletes the data item d sets the end time $d.TT^e$ to the current time $t_{current}$, indicating that the data item d ceased to be current at the transaction time $t_{current}$. Update transactions are typically implemented as deletions of the original data item d to be updated followed by an insertion of the updated data item d.

A common query in a database having transaction time support is termed a time slice. A time slice asks for the set of data items that were current at some past time t. The time slice query is answered by finding each data item d having a start time $d.TT^s$ on or before the past time t requested and an end time $d.TT^e$ that was on or after the time t requested. The time slice at time t returns the state of the database that was current at the past time t.

When user specified transactions are supported, it is necessary to use the same timestamp value for all statements in the same transaction. It would be possible for a time slice to return an inconsistent database state if the same timestamp is not used for all statements in a single transaction. Using the same timestamp for all statements of a transaction makes all actions of a transaction conceptually take place at the same time. However, the SQL standard currently allows different statements in the same transaction to use separate timestamp values.

The specific choice of the time that is used for timestamping the data items of a transaction is essential to ensuring that any previous database state that can be retrieved via a time slice at a past time t is indeed the database state that was current at the past time t. If the transaction timestamp order does not agree with the serialization order of the transactions, it is possible that the time slice will return a database state that never existed as a current database state.

In the SQL database language, a query or modification can reference the current time, $t_{current}$. The current time can be stored as an attribute in the database or used to query the database. For example, the current time $t_{current}$ can be used to retrieve the state of the database that was current ten minutes ago. Referencing the current time $t_{current}$ in a query can force the database management system to choose this time before a transaction commits. Choosing the current time before the transaction commits exposes the transaction to the risk that it will subsequently be discovered that the transaction timestamp given to the transaction and the timestamp values given to other transactions are not ordered in a way that is consistent with a valid transaction serialization order. Table 1 is a schedule of two transactions $T_1$ and $T_2$ that choose the current time as the transaction timestamp early in the transaction.

| TIME | $T_1$ | $T_2$ |
|---|---|---|
| 1 | fix $t_{current}$ | |
| 2 | w((x,10,[1, now))) | |
| 3 | | fix $t_{current}$ |
| 4 | | w((y,31,[3, now))) |
| 5 | | Commit |
| 6 | | |
| 7 | r((y,31,[3, now))) | |
| 8 | w((z,14,[1, now))) | |
| 9 | commit | |

Referring to Table 1, at Time 1 the timestamp for transaction $T_1$ timestamp is fixed at 1. At Time 2, transaction $T_1$ writes data item x and sets the start time for the data item x to 1 (the transaction's timestamp) and sets the end time for data item x to the continuously updating variable now, since the data item x is current. At Time 3, the transaction $T_2$ timestamp is fixed at 3. At Time 4, transaction $T_2$ writes the data item y and sets the start time for data item y to 3 (the transaction's timestamp) and sets the end time for y to the variable now, since the data item y is current. At Time 5, transaction $T_2$ commits. At Time 7, transaction $T_1$ reads the data item y. At Time 8, transaction $T_1$, writes data item z and sets the start time for data item z to 1, transaction $T_1$'s timestamp. The end time for data item $d_3$ is set to the variable now, since the data item $d_3$ is current.

Table 1 illustrates that a time slice may not produce an accurate representation of the database at a given time t if the transaction timestamp order does not agree with serialization order. The transaction timestamp order shown in Table 1 is transaction $T_1$, which fixes its timestamp at time 1, followed by transaction 2, which fixes its timestamp at Time 3. However, there is a read-write conflict between transaction $T_1$ and transaction $T_2$. Transaction $T_1$ reads data item y that is written by transaction $T_2$. This read-write conflict puts transaction $T_2$ before transaction $T_1$ in any serializable schedule involving these two transactions, since data item y is written by transaction $T_2$ before data item y is read by transaction $T_1$. As a result, the transaction timestamp order does not agree with the serialization order of the two transactions.

For simplicity of exposition, we elide the writes done to delete old versions when updates occurs. A read-write conflict on data item y between transactions $T_1$ and $T_2$ puts $T_2$ before $T_1$ in any serializable schedule involving these two transactions. In addition, $T_1$ chose its $t_{curren}$ value at Time 1, in preparation for the write statement at Time 2, while $T_2$ chose its $t_{curren}$ value at Time 3. Note also that this schedule is allowed by two-phase locking. This results in serialization order being different from timestamp order, and causes two potential problems. First, a timeslice for <y,z> for Time 2, issued at Time 6, returns <y=$y_0$,z=$z_0$> since $T_2$ has a time later than Time 2 and $T_1$ has not yet committed or even accessed z yet. However, the same timeslice (i.e., for Time 2), instead issued at Time 10, returns <y=$y_0$,z=14> because it sees the z written by $T_1$. Second, clearly one of these timeslice results (the later one in this case) is not a transaction consistent view of the database. This is unacceptable.

The anomaly illustrated by Table 1 can be avoided if a transaction X's timestamp can be established at the time at which the transaction X is committing. At the time the transaction X is committing, the timestamp can be chosen to agree with the commit ordering of the transactions. However, a transaction may be forced to choose a timestamp at an earlier point in the transaction, for example, when the transaction asks for the current time or date. If a transaction asks for the current time or date, the transaction must have a timestamp that corresponds with the current time or date returned by the database management system. When the transaction is forced to choose a timestamp before the transaction is committing, keeping the timestamp order consistent with a valid transaction serialization order becomes a substantial problem. Prior proposals for transaction timestamps have either not addressed early timestamp choice, have not avoided excessively restricting potential concurrency or have resulted in excessive transaction aborts.

One proposed prior timestamping approach is referred to as commit time choice of timestamp. If the transaction is able to delay the choice of the transaction's timestamp until transaction commit, it is possible to simply choose a timestamp that reflects the order in which the transactions have committed. The transaction timestamp reflects the transactions time of commit. Commit time choice of timestamp requires that something other than timestamp ordering be used for concurrency control. One concurrency control technique that has been proposed is known as two-phase locking. FIG. 2 is a flow chart that generally shows how locking works. For a data item being read, the transaction will determine if there is an active transaction write. The transaction will know whether or not there is an active transaction write, because a write or exclusive mode lock is placed on each data item being written. If there is an active transaction write, the transaction will block or prevent the data item from being read. If there is not an active transaction write on the data item, the transaction will place a read or share mode lock on the data item being read. The read or share mode lock on the data item being read allows the data item to be read by other transactions but does not allow the data item to be written.

When data items are written by a transaction, the transaction determines whether there is an active transaction read or write on the data item being written. The transaction can determine whether there is an active transaction read by determining whether a transaction has placed a read lock on the data item and can determine whether there is an active transaction write by determining whether a transaction has placed a write lock on the data item. If there is an active transaction read or write of the data item, the transaction blocks the write to the data item until there is no longer an active transaction read or write. If there is not an active transaction read or write, the transaction places a write lock or exclusive mode lock on the data item. The write lock or exclusive mode lock prevents the data item being written by the transaction from being read or written by other transactions. Two phase locking means that a transaction acquires all of its locks prior to releasing any of the locks. If all transactions follow this discipline, the result will be a serial schedule of transactions. Most systems follow a more stringent locking policy called strict two phase locking. This policy provides that no lock is released until a transaction is ready to commit. Strict two phase locking guarantees that a transaction can be rolled back should it abort, without triggering the rollback (abort) of any other transaction. In what follows, we assume that strict two phase locking is in use.

Strict two-phase locking has been considered for use in conjunction with commit time choice of timestamp to assure that timestamps agree with the transaction serialization order. FIG. 3 is a flow chart showing the steps involved in commit time choice of timestamp when a request for current time has not been requested by the database management system. FIG. 4 is a flow chart that attempts to use the same general approach involving variable LAST when the current time has been requested. Referring to FIG. 3, variable LAST is maintained by the database and represents the time the last transaction was committed. For each subsequent transaction that attempts to commit the timestamp for the transaction is set to a value greater than the variable LAST. The variable LAST is then updated to the new greatest timestamp.

One problem with commit time choice of timestamp is that it does not permit the database to be responsive to a request by a statement in the transaction for the current time. When a request for the current time occurs, the database cannot simply choose a timestamp at commit. Rather, the timestamp must be selected when the request for current time occurs, so the timestamp assigned to the transaction corresponds to the requested current time. Referring to FIG. 4, commit time choice of timestamp may set the transaction timestamp to LAST when the current time is requested. As each subsequent transaction with a timestamp greater than LAST commits, the variable LAST is set to the new larger timestamp value. Transactions having a timestamp less than the variable LAST are aborted, enforcing the rule that timestamp order agree with serialization order of the transactions. This rule can cause a large number of transactions to be aborted. For example, any transaction having a transaction timestamp set to LAST as a result of a request for current time will be aborted if another transaction commits before the transaction that requested the current time, since the variable LAST will update to the time the last transaction committed.

Another proposed method of assigning timestamps to transactions is known as timestamp order concurrency control. FIG. 5 is a flow chart showing timestamping of transactions in accordance with timestamp order concurrency control. Timestamp order concurrency control forces transactions to commit in the order of the timestamps assigned to the transactions. When the commit of a transaction will violate the order of the transaction timestamps, the transaction is aborted.

Timestamp order concurrency control has existed for about 20 years. Referring to FIG. 5, timestamp order concurrency control chooses the timestamp $t_X$ for a transaction at the start of the transaction or at the time the transaction first accesses data. The transaction timestamp is assigned to data items when they are read and written by the transaction. Transactions can access data such that write-write conflicts, write-read conflicts and read-write conflicts are created. Timestamp order concurrency control associates a write timestamp d.TT (referred to as the start time above) and a read timestamp $d.T^R$ with each data item d in the database. The write transaction d.TT refers to the time the data item was written. The read timestamp $d.T^R$ refers to the time the data item was last read. Timestamp order concurrency control attempts to minimize aborts resulting from transaction ordering conflicts by maintaining precise timestamp constraints for each transaction and each data item.

In transaction-time databases, the start time or write timestamp d.TT is stored persistently with the data to maintain all previously current states of the database and thus support time slice queries. The stored start values d.TT of the data allow the database management system to handle write-write and write-read conflicts. To deal with read-write conflicts, the time each data item was last read $d.T^R$ must also be maintained. Whenever a data item d is read by a transaction X with a timestamp $t_X$ that is larger than the data item's current read time $d.T^R$, the data item's read time $d.T^R$ is set to the transaction timestamp $t_X$. The read time $d.T^R$ does not need to be a persistent part of the database, since queries typically do not ask when the data was last read. As such, the timestamp order concurrency control methods can exploit a volatile data structure that captures the read time $d.T^R$ for each data item d and periodically clears the read times for data items that have not been written within a fixed time interval.

Referring to FIG. 5, after the transaction is given a timestamp $t_X$ at the start of the transaction, a transaction writing data items compares the transaction timestamp $t_X$ to the read timestamps $d.T^R$ of the data items and compares the transaction timestamp $t_X$ to the write timestamps d.TT of the data items. The data item's read timestamps $d.T^R$ are maintained in a volatile structure, while the write timestamps d.TT are maintained in the stable transaction-time database. For each data item being read by the transaction, the transaction timestamp $t_X$ is compared to the write timestamp d.TT of the data item being read. If the transaction timestamp $t_X$ is less than the write timestamp d.TT the transaction aborts. A later transaction wrote data item d, so the transaction came too late. If the transaction timestamp $t_X$ is greater than the time the data item was written d.TT the data item d is read by the transaction. If the transaction timestamp $t_X$ is greater than the data item read timestamp $d.T^R$, then the transaction sets the read timestamp $d.T^R$ for the data item to the transaction timestamp $t_X$.

For data items being written by the transaction, the transaction compares the transaction timestamp $t_X$ to both the time the data item was written d.TT (write timestamp) and the time data item was read $d.T^R$. (read timestamp) If the transaction timestamp $t_X$ is less than the time the data item was written d.TT or the time the data item was last read $d.T^R$ the transaction aborts, because a later transaction read or wrote the data item d. If the transaction timestamp $t_X$ is greater than both the time the data item was written d.TT and the time the data item was last read $d.T^R$, the data item is written by the transaction and the write timestamp of the data item d.TT is set to the transaction timestamp $t_X$.

Timestamp order concurrency control presents at least two problems. The first problem is that each transaction needs to have a timestamp $t_X$ when the transaction starts, so that the transaction can use the timestamp $t_X$ in the timestamp consistency testing. By forcing the choice of the transaction timestamp at the transaction start, the probability that the timestamp consistency check will fail, resulting in an abort, significantly increases.

A second problem with timestamp order concurrency control is that a potentially enormous number of variable data read timestamps $d.T^R$ need to be stored in the database. The access structure for the data read timestamps $d.T^R$ needs to provide efficient access for all current data items and needs to be a dynamic structure that can grow in size as more data items are included in it. At some point, the growth of the structure for storing data read timestamps $d.T^R$ must be limited so that it can be reasonably maintained in volatile memory.

Timestamp order concurrency control methods have proposed what is known as garbage collection to prune the structure that stores the read timestamps $d.T^R$. One garbage collection technique deletes read timestamps that are older than some arbitrary time $\delta$. That is, any read timestamp $d.T^R$ that is less than the given time $\delta$ subtracted from the current time $T_{current}$ is deleted. All data items without an explicit read timestamp are implicitly given a read timestamp equal to the result of subtracting the given $\delta$ from the current time. If a transaction with a timestamp that is less than $T_{current} - \delta$ writes a data item that does not have a stored read timestamp, the transaction is aborted. The garbage collection method may thus implicitly set the read timestamps $d.T^R$ of data items to values that are significantly larger than the previously assigned read timestamps, which may result in additional transaction aborts.

SUMMARY OF THE INVENTION

The disclosed system and method concern transaction timestamping in temporal databases. The system and method assigns transaction timestamps that are consistent with the transaction serialization order and minimizes transaction aborts. One aspect of the disclosed system and method assigns acceptable upper and lower bounds for the transaction timestamp before the transaction timestamp is assigned. A transaction timestamp lower limit is set when a data item is read to be the larger of the time the data item was written and the previous timestamp lower limit. When a data item is written, the transaction timestamp lower limit is set to the largest of a time the data item was previously written, a time the data item was last read and the previous timestamp lower limit. A transaction timestamp upper limit is set to an end of a time interval that is requested by the transaction based on the precision of the current time requested by the transaction. The transaction timestamp is assigned a value between the transaction timestamp lower limit and the transaction timestamp upper limit.

The disclosed system and method assigns an upper timestamp limit when it is determined that a current time has been requested by the transaction that has precision that is less than the maximum precision of the transaction timestamp.

The upper timestamp limit is the maximum time that can be produced by extending the precision of the current time request. The transaction timestamp lower limit is set as described above. When it is determined that a time interval has not been requested by the transaction, a transaction timestamp is assigned a value that is greater than the timestamp lower limit. When it is determined that a time interval has been requested by the transaction, a transaction timestamp upper limit is set to an end of the time interval requested by the transaction. The transaction timestamp is assigned a value between the transaction timestamp lower limit and the transaction timestamp upper limit.

The disclosed system and method varies the manner in which timestamps are assigned based on a request for current time by a transaction. The disclosed system and method sets an initial transaction timestamp lower limit. During a first phase of transaction execution, the lower limit is updated based on reading and writing of data. If a data item is read, the timestamp lower limit is updated to a time that is at least as large as the time the data was written. If a data item is being written, the timestamp lower limit is updated to a time at least as large as the time the data was previously read or written. A second phase of transaction execution occurs after a request for current time is processed. In the second phase, the upper limit is evaluated based on reading and writing of the data. If data is read, and the upper limit is less than the time the data was last written, the transaction is aborted. If the data is written by the transaction and the upper limit is less than the time the data was previously read or written, the transaction is aborted. The transaction is committed by finalizing the reading and writing of the data to the database unless the transaction aborted during the second phase of transaction execution.

The disclosed system and method assigns read timestamps to sets of data items. The read timestamps assigned to the sets of data items are used to set the transaction timestamp lower limit. When a data item is read, a transaction lower limit is set to the larger of the time the data item was written and a previous transaction timestamp lower limit. When a data item is written, the transaction timestamp lower limit is set to the largest of the time the data item was previously written, a read timestamp assigned to a set of data items that corresponds to the data item being written and the previous timestamp lower limit. The transaction timestamp is set to a value that is greater than the timestamp lower limit.

A table may be used to assign the read timestamps to the corresponding sets of data items. Read times are stored in entries of a table that correspond to sets of data items. A transaction timestamp is assigned to the transaction. A list of all data items read by the transaction is stored. At transaction commit, entries in the table that correspond to each data item read by the transaction are accessed. The read time of each accessed entry of the table is updated to the transaction timestamp when the transaction timestamp is greater than the read time stored in the entry of the table.

In one embodiment, read timestamps are stored in storage locations of a hash table. A hash function determines the storage location of the hash table that is accessed by a given data item. Read timestamps for multiple data items may share a single memory location in the hash table. The memory location is set to the highest read timestamp for the data items that share the memory location. Read timestamps are assigned to sets of data items in this manner. For data items that are written by a transaction, the hash table is accessed to set the transaction timestamp lower limit. For data items read by a transaction, the read timestamps stored in the hash table are updated to the greater of the transaction timestamp and the existing timestamp stored in the storage location of the hash table.

These and other objects, advantages and features of an exemplary embodiment are described in conjunction with the accompanying drawings.

DETAILED DESCRIPTION

Figure 1:
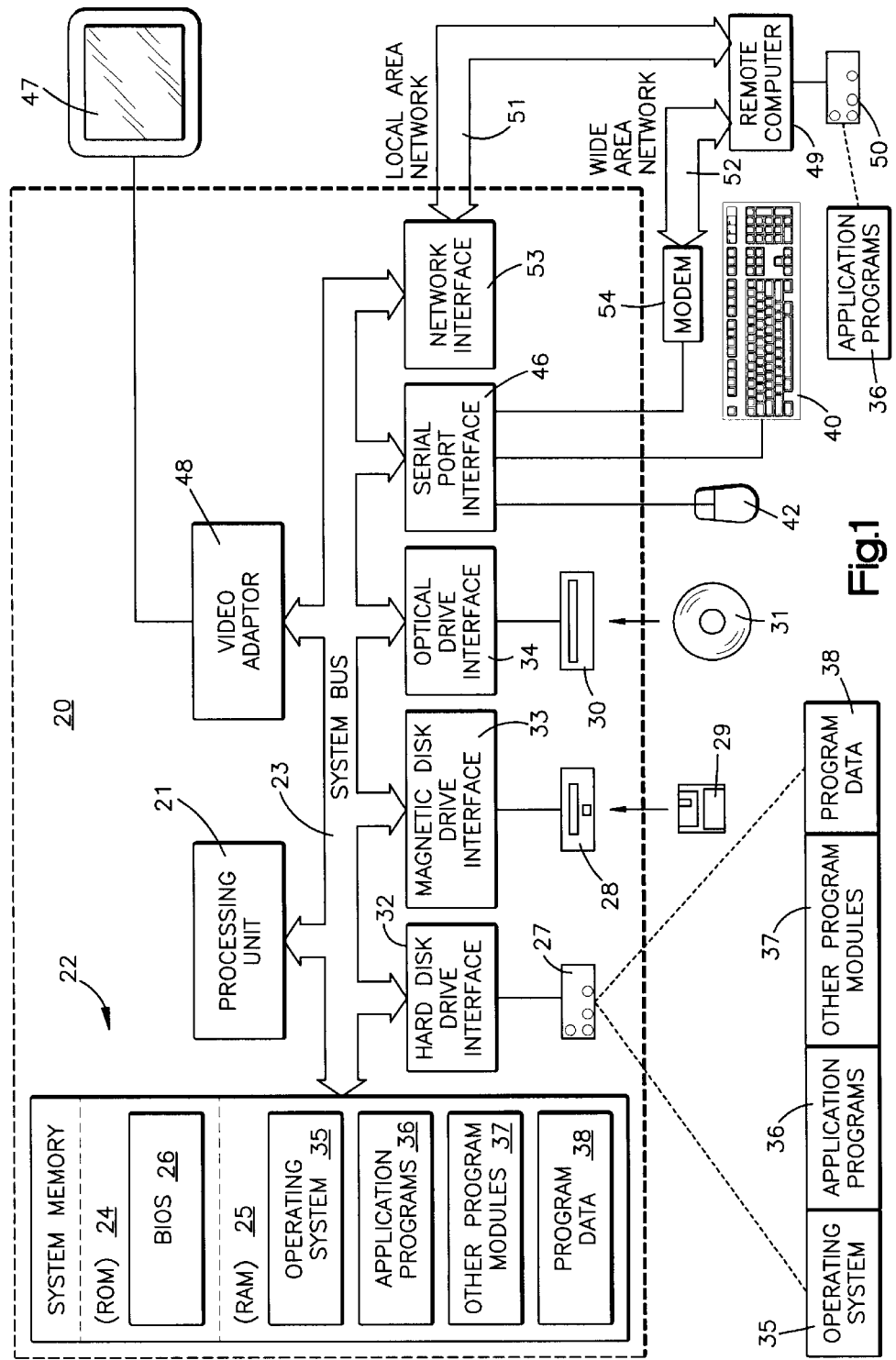
FIG. 1 is a schematic depiction of a computer system used in practicing an exemplary embodiment of the present invention.
Figure 2:
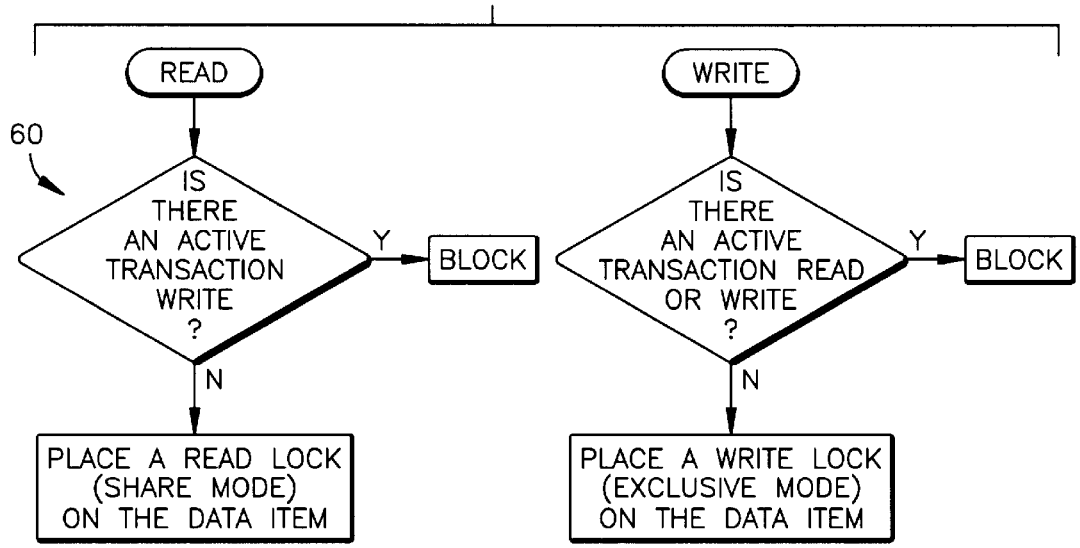
FIG. 2 is a flow chart depicting read and write locking of data in a database.
Figure 6:
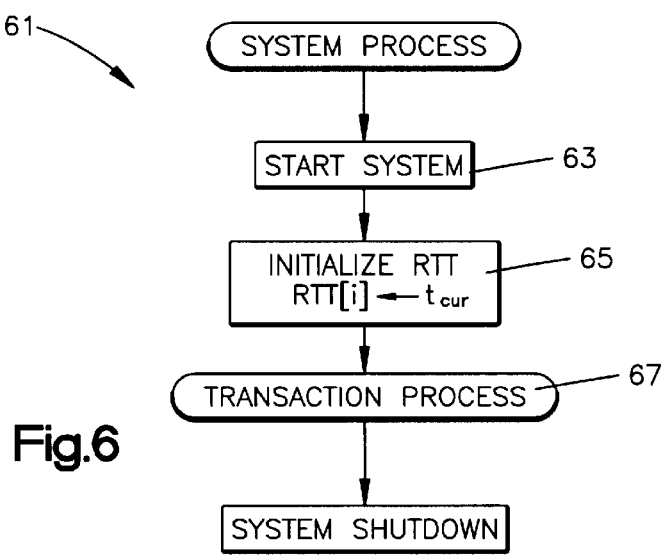
FIG. 6 is a flow chart depicting a system process in accordance with the present invention.
Figure 3:
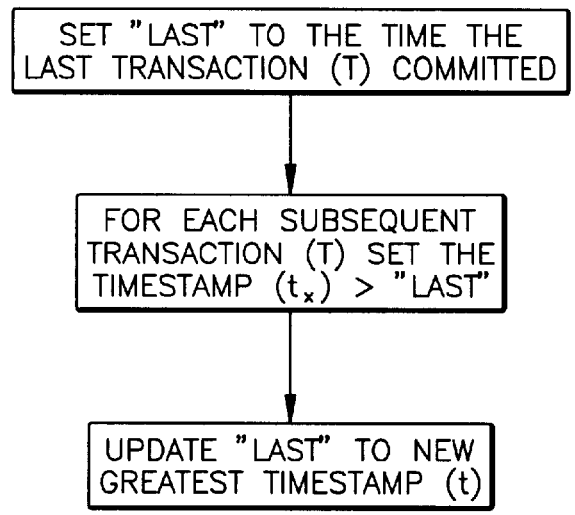
FIG. 3 is a flow chart depicting timestamping of data in a database.
Figure 4:
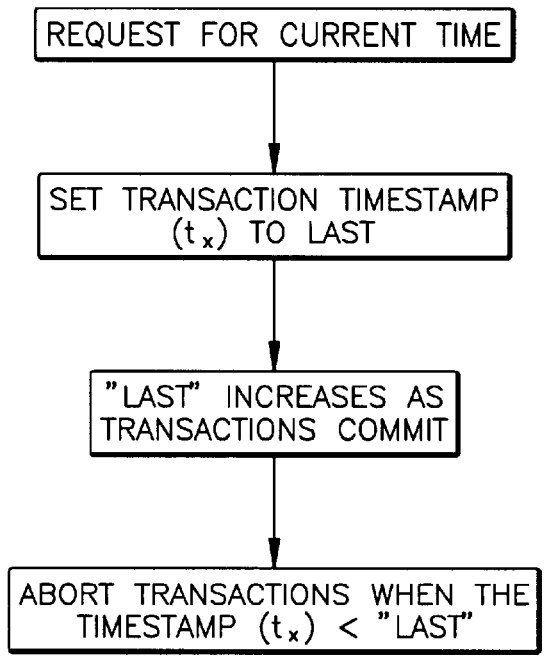
FIG. 4 is a flow chart depicting timestamping of data in a database.
Figure 5:
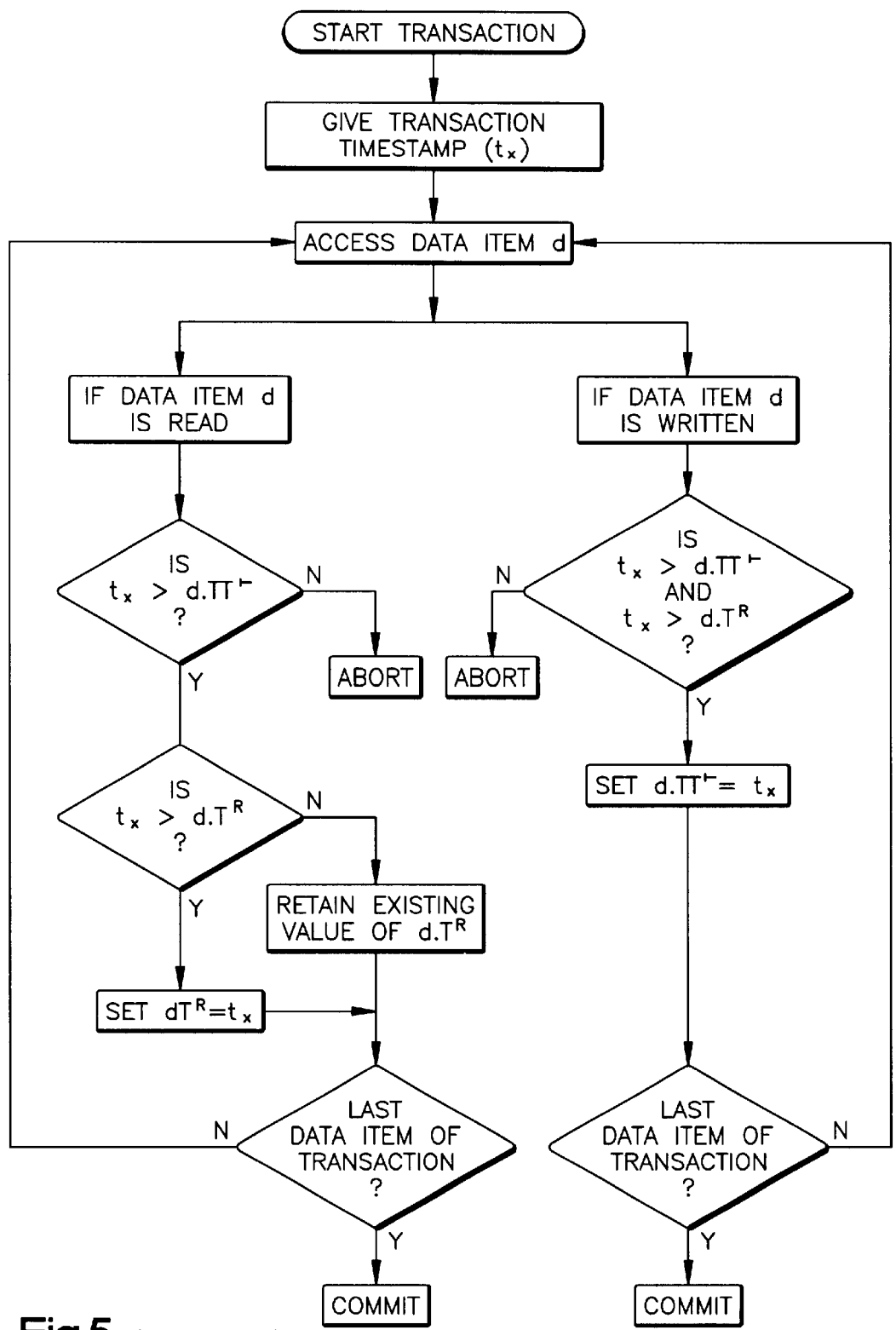
FIG. 5 is a flow chart depicting timestamping of data in a database in accordance with timestamp order concurrency control.

The exemplary embodiment of a new method for timestamping database records is implemented by software executing instructions on a general purpose computer 20. A schematic of a representative computer is shown in FIG. 1. A system process 61 is shown in FIG. 6. In the exemplary embodiment, the system process 61 involves starting the system 63, initializing an RTT table 65, a transaction process 67 and system shutdown 69.

Timestamps of data items written by a transaction are assigned based on the transaction's timestamp. The new method of assigning timestamps to database records avoids selection of a transaction's timestamp at the start of the transaction and does not require a large, impractical storage for maintaining read timestamps of transactions.

Late Timestamp Assignment

The disclosed method allows the choice of a transaction's timestamp to be delayed until the moment when the timestamp is needed by a statement in the transaction, such as a request for current time or even later, when the transaction commits. The disclosed method delays the selection of a transaction timestamp by setting upper and lower limits for the transaction timestamp as the transaction progresses.

Each data item d in a transaction-time database has a write timestamp $d.TT^t$, which is set to the timestamp of the transaction that created the data item d. In the exemplary embodiment, a read timestamp $d.T^R$ is associated with each current data item via a volatile data structure, such as a hash table.

Figure 7:
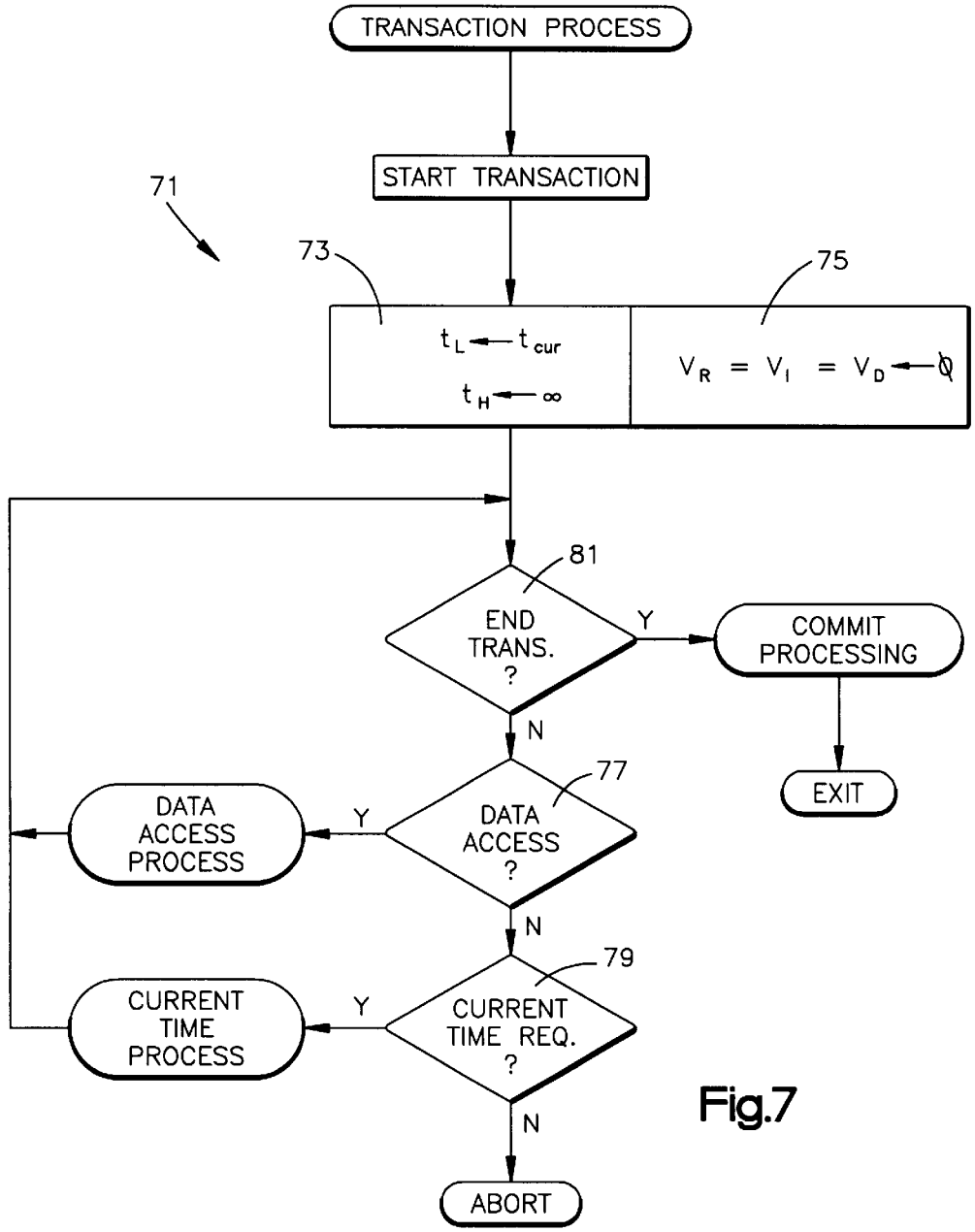
FIG. 7 is a flow chart depicting a transaction process in accordance with the present invention.
Figure 8:
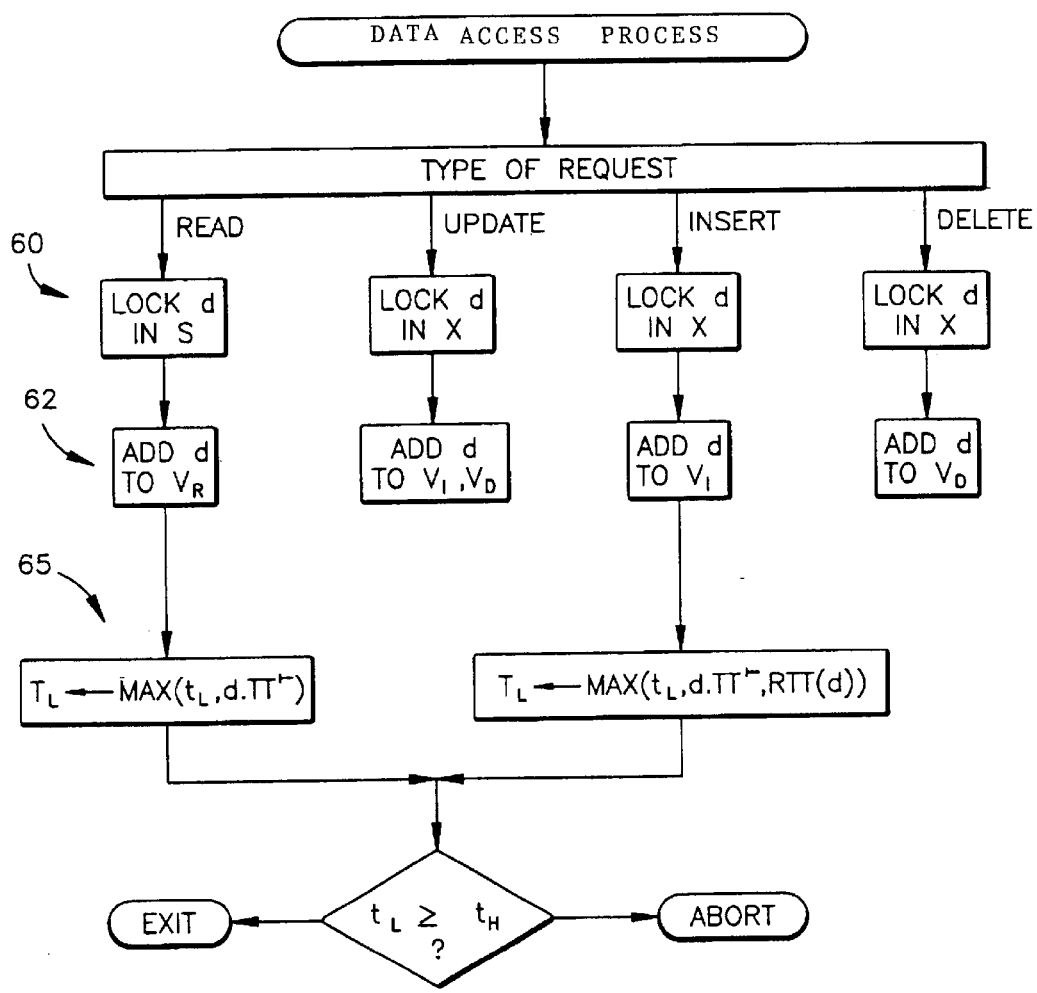
FIG. 8 is a flow chart depicting a data access process in accordance with the present invention.
Figure 9:
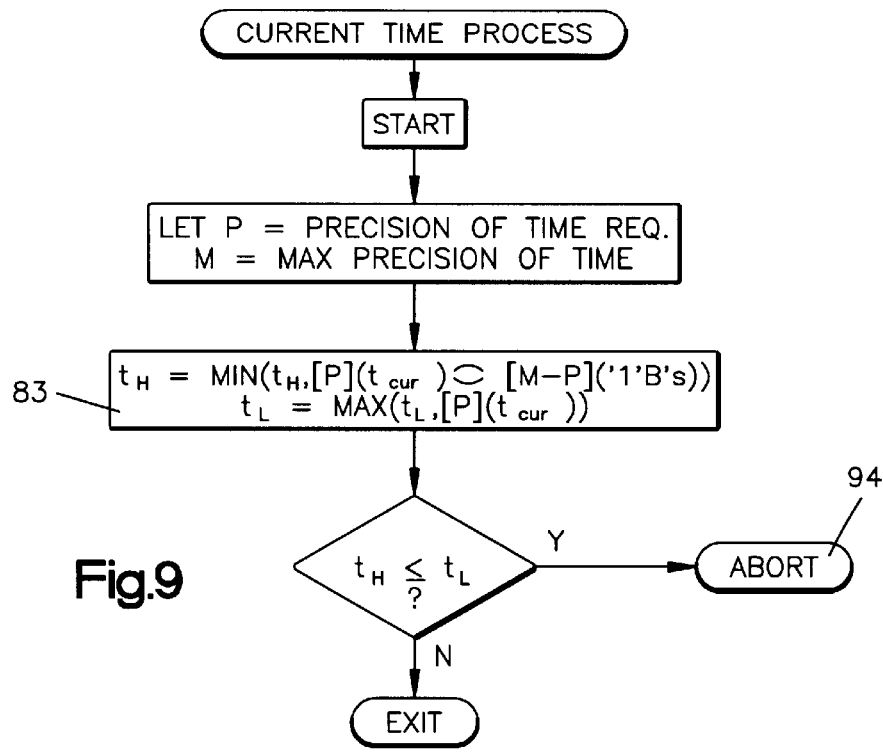
FIG. 9 is a flow chart depicting a current time process in accordance with the present invention; and, FIG. 10 is a flow chart depicting a commit time process in accordance with the present invention.
Figure 10:
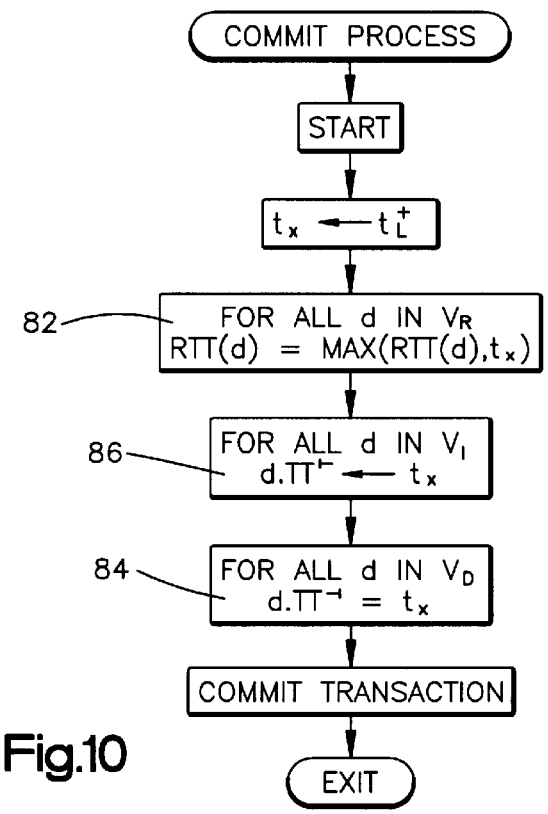

FIG. 7 is a flowchart that outlines an exemplary transaction process 71. At the start of the transaction a timestamp lower $t_L$ is initialized 73 to the current time $t_{curr}$ and a timestamp upper limit $t_H$ is initialized 73 to infinity. Variables $V_R$, $V_I$ and $V_O$ that record the sets of data items read, inserted and deleted are initialized 75 to the empty set Ø. The transaction may access data 77 and request the current time 79. At the end of a transaction 81, the transaction is committed. FIG. 8 shows a data access process of the new method. FIG. 9 shows a current time process of the new method. FIG. 10 shows a commit process of the new method.

Referring to FIG. 8, during the data access process, conventional two-phase locking 60 is used to block transactions from reading data that is being written by an uncommitted transaction, from writing data being read or written by an uncommitted transaction, and for serializing transactions. The new method takes advantage of the fact that timestamps do not need to protect data of an active transaction. Transaction timestamps are associated with data processed by the transaction to ensure that subsequent transactions have timestamps that are consistent with the ordering resulting from write-write, read-write, and write-read conflicts. Only after commit is it required that transaction timestamps be associated with data processed by the transaction, since strict two phase locking 60 prevents conflicts before the transaction commits.

During the execution of a transaction, the new method retains information that is used when the transaction's timestamp is assigned, and provides information that governs the selection of the timestamps for other transactions. Referring to FIGS. 7 and 8, data accesses define a lower bound $t_L$ on the value that can be chosen as the transaction's timestamp. The lower bound $t_L$ is initialized 73 to the current time $t_{cur}$ at the execution start of the transaction, so that the timestamp chosen for the transaction cannot be before the start of the transaction. As each data item is accessed, the method records 62 the set of data items read by the transaction $V_R$, the set of new items inserted by the transaction $V_I$, and the set of data items deleted by the transaction $V_D$. An update of a data item d is treated as a delete of a data item d followed by an insert of a new data item d' in the same transaction. As noted above, the set of data items read by the transaction $V_R$, the set of new items inserted by the transaction $V_I$, and the set of data items deleted by the transaction $V_D$ are initialized to the empty set Ø.

Before Current Time Request

A transaction may be forced to select a timestamp $t_X$ or at least an upper bound for the timestamp before the transaction commits, because the transaction requests the current time. However, before a timestamp (or an upper bound on the timestamp) has been assigned, a transaction is never aborted due to timestamping constraints because the timestamping constraints are never violated. When a transaction has not been forced to select a timestamp (or timestamp upper bound), a timestamp can always be chosen that satisfies the necessary constraints, which only involve a lower bound. The disclosed method delays as long as possible before selecting a timestamp for the transaction, when the transaction is not forced to select a timestamp. Delaying the time at which the timestamp is selected reduces the chance that the transaction will be aborted because of timestamp consistency requirements. Before a request for current time, the new method updates 65 a lower limit that determines the constraints that the eventual timestamp $t_X$ must satisfy. This lower limit (lower bound) information that is eventually used to select the transaction timestamp $t_X$ is updated when the transaction attempts to read or write a data item.

Referring to FIG. 8, for each data item d that is read by the transaction, locking 60 blocks the transaction if there is an active write on the data item d. Once the data item d can be accessed, the method ensures that the transaction X will be given a timestamp $t_X$ later than the write timestamp of the data item d being read d.TT$^t$. To satisfy this constraint the timestamp lower limit $t_L$ is incrementally set to the write timestamp d.TT$^t$of each data item d being read if the write timestamp d.TT$^t$of the data item d being read is greater than the current timestamp lower limit $t_L$. (For reads, set $t_L$=max (existing $t_L$, d.TT$^t$)). The new method also records the set $V_R$ of data items read by the transaction.

Transaction writes of data items include insertions of data items and deletions of data items. Referring again to FIG. 8, for data items d that are being written by the transaction X, locking 60 blocks the transaction if there is an active read or write on the data item d being written by the transaction. Once the data item can be written, the method ensures that the transaction will be given a timestamp $t_X$>max(d.T$^R$, d.TT$^t$) (the larger of the read timestamp assigned to the data item d being written and the write timestamp of the data item being written). To satisfy this constraint the timestamp lower limit $t_L$ is set to the greater of the read timestamp d.T$^R$ assigned to the data item d being written and the write timestamp d.TT$^t$of the data item d being written if the read timestamp d.T$^R$ or the write timestamp d.TT$^t$of the data item d being written is greater than the current timestamp lower limit $t_L$. (For writes, set $t_L$=max(existing $t_L$, d.T$^R$, d.TT$^t$)). In the illustrated embodiment, $t_L$ is set to $t_L$=max (existing $t_L$, d.TT$^t$, RTT(d)). RTT(d) is the value of a read timestamp stored in a read timestamp table RTT that is assigned to data item d. RTT(d) is guaranteed to be greater than d.T$^R$. As mentioned previously, the method also records 62 the set of data items written by the transaction. Each data item that has been inserted by the transaction is recorded in the set of inserted data items $V_I$. Each data item that has been deleted by the transaction is recorded in the set of deleted data items $V_D$.

Timestamp Constraints and Timestamp Assignment

The disclosed method chooses a timestamp $t_X$ for a transaction that satisfies constraints that enforce write-read, read-write and write-write conflicts. If the transaction is not forced to choose a timesatamp $t_X$ before commit (i.e. by a request for current time) the constraints that enforce write-read, read-write and write-write conflicts can always be satisfied.

A first constraint on the timestamp requires the transaction timestamp $t_X$ to be greater than the write timstamp d.TT$^t$for the set $V_R$ of all data items read by the transaction. This constraint enforces write-read conflicts.

A second constraint requires the transaction time stamp $t_X$ to be greater than an assigned read timestamp d.T$^R$ for the set $V_I$ of all data items inserted by the transaction and for the Set $V_D$ of all data items deleted by the transaction . This constraint enforces read-write conflicts.

A third constraint requires the transaction timestamp $t_X$ to be greater than the write timstamp d.TT$^t$for the set $V_I$ of all data items inserted by the transaction and for the set $V_D$ of all data deleted inserted by the transaction. This constraint enforces write-write conflicts.

The disclosed method utilizes a variable timestamp lower bound $t_L$ that satisfies the constraints that enforce write-read, read-write and write-write conflicts. If a request for current time has not been requested, an upper bound for the transaction timestamp does not have to be assigned (initialized to infinity ∞) and an acceptable timestamp can always be assigned.

Referring to FIG. 6, the disclosed method takes into account the possibility that a transaction may be assigned a timestamp in the midst of the transaction's data accesses. In the exemplary embodiment, upper and lower timestamp limits $t_H$, $t_L$ are incrementally updated during execution of the transaction. In addition, a transaction can change from a transaction without a timestamp to a transaction with a timestamp at any time during the transaction. A request for the current time, e.g., CURRENT TIME in SQL, forces the transaction to select a timestamp (or at least a timestamp upper limit) to be assigned prior to commit. If a request for a fully precise current time is not made, the exemplary method waits until the transaction commits to assign a timestamp that agrees with transaction conflict order.

Monotonically increasing transaction timestamps in which each timestamp assigned is greater than all previously issued timestamps would provide a transaction timestamp $t_X$ that satisfies all prior timestamp constraints, but would lead to a large number of aborts. However, the disclosed method achieves tighter bounds by remembering the largest write timestamp d.TT for any data item d that has been accessed by the transaction, and the largest read timestamp $d.T^R$ for any data item d that has been updated by the transaction. This is accomplished by establishing and incrementally updating the variable transaction timestamp lower limit $t_L$. The method then sets the timestamp $t_X$ to a value that is greater than the lower limit $t_L$. In the exemplary embodiment, the disclosed method selects a minimum timestamp $t_X$ that satisfies the timestamp constraints immediately before commit, as there will be no further opportunity for the transaction to violate timestamp constraints. The selection of a minimum transaction timestamp $t_X$ improves the likelihood that other transactions will satisfy timestamp constraints.

After Current Time Request

After a timestamp $t_X$ for an uncommitted transaction is fixed (or an upper bound established) because of a current time request, the transaction runs the risk that timestamp constraints will be violated. The disclosed method aborts a transaction if a timestamp constraint is violated.

Referring to FIG. 8, for data items d that are being read by the transaction, locking 60 blocks the transaction if there is an active write on the data item d. Once the data item d can be accessed, a read (share mode) lock is placed on the data item d and the method performs a timestamp check 70. If the transaction X that is reading data has a timestamp upper bound $t_H \leq d.TT$, the write timestamp of the data item d being read, the transaction is aborted 72 since no transaction timestamp $t_X$ can be chosen that satisfies the constraints. Otherwise the transaction proceeds as usual. The method records 62 the set of data items read by the transaction $V_R$ for commit time processing.

For data items d that are being written by the transaction X, locking 60 blocks the transaction if there is an active read or write on the data item d being written by the transaction. Once the data item can be written, a write (exclusive mode) lock is placed on the data item d and the method performs a timestamp check. If the transaction timestamp upper bound $t_H \leq \max(d.T^R, d.TT)$ (the larger of the read timestamp assigned to the data item d being written and the write timestamp of the data item being written) the transaction aborts 78. Otherwise the transaction proceeds as usual. The new method also records 80 the set of data items written by the transaction. Each data item that has been inserted by the transaction is recorded in the set of inserted data items $V_I$ for commit time processing. Each data item that has been deleted by the transaction is recorded in the set of deleted data items $V_D$ for commit time processing.

Commit Processing

Referring to FIG. 10, at commit time the disclosed method ensures that the database properly reflects that transaction X with timestamp $t_X$ has committed. The method posts timestamp information with the data items that have been read and written by the transaction, which ensures that subsequent transactions can be assigned appropriate timestamps.

For data items that are read by the transaction X, the read timestamps of the set $V_R$ of data items read by the transaction are set 82 to the transaction timestamp $t_X$ if the timestamp is greater than the existing value of the read timestamp. In the disclosed method, the read timestamps $d.T^R$ for data items can be greater than is required. The assignment of read timestamps $d.T^R$ can be a conservative action, because the read timestamp $d.T^R$ does not play a permanent role in a transaction-time database. The read timestamps $d.T^R$ are only used to enforce read-write ordering. If a transaction aborts, nothing needs to be done about data items that were read by the transaction.

For writes by the transaction that delete data items d, the data item's end timestamp d.TT is updated 84. The method accesses the set $V_D$ of data items deleted by the transaction from the current state and sets the data items' end timestamp d.TT to the transaction's timestamp $t_X$.

For writes by the transaction that insert data items d, the data item's start timestamp d.TT is updated. The method accesses the set $V_I$ of data items inserted by the transaction to the database's current state and sets 86 the data item's start timestamp d.TT to the transaction's timestamp $t_X$.

Table 2 is an example of how data is written to the data base. When a data item d is deleted by a transaction the data item's end timestamp d.TT is set to the transaction's timestamp $t_X$. When a data item d is inserted into the database by a transaction the data item's start timestamp d.TT is set to the transaction timestamp $t_X$ and the data item's end timestamp is set to the variable now. When a data item d is updated to a new value d' the method deletes the data item d and inserts a new data item d'. Data item d's end timestamp d.TT is set to the transaction's timestamp $t_X$ and data item d's start timestamp d.TT is set to the transaction timestamp $t_X$.

TABLE 2

| User-level Operation | Low-level Operation(s) |
| --- | --- |
| delete d | $w(d,[t,t_x))$ |
| insert d | $w(d,[t_x,now))$ |
| update d to d' | $w(d,[t,t_x))$ |
|  | $w(d',[t_x,now))$ |

Incremental Timestamp Refinement

In addition to delaying timestamp choice the disclosed method keeps the timestamp as imprecise as possible, which further reduces the likelihood of transaction aborts. The disclosed method assigns a lower bound $t_L$ for the timestamp $t_X$ that will be assigned to the transaction X.

There may be an implicit assumption that a precise timestamp $t_X$ is assigned when the current time is requested or at commit time. However, the transaction timestamp only has to be fully precise when a fully precise current time $t_{current}$ is specified. For example, a request for the current day, hour, minute or even second is not a fully precise current time. The current day, hour, minute and second are periods of time having beginnings and endings. Referring to FIG. 9, the disclosed method ensures that a transaction's timestamp is within a current time interval requested by the transaction. Requests for current time intervals rather than precise times allows timestamps to be chosen late, even when a request for current time $t_{current}$ is requested.

Referring to FIG. 9, instead of fully specifying a timestamp for a transaction when the current time is requested, the method instead uses the request to provide an upper bound $t_H$ on the value of the current time $t_{current}$ for the transaction X, and hence on the transaction timestamp $t_X$. Only when a fully precise time is specified is the current time $t_{current}$ fully specified, and hence the transaction timestamp $t_X$ fully determined. Perceiving requests for current time as requests for time intervals permits the choice of the transaction timestamp $t_X$ to be refined incrementally during transaction execution. When the disclosed method is employed, the choice of transaction timestamp usually need not be completely defined until the transaction commits. At commit, the disclosed method posts the selected timestamp to data items that have been read and written by the transaction, and so a precise timestamp is required at commit.

The disclosed method utilizes a timestamp range that has upper bound $t_H$ and a lower bound $t_L$. In the exemplary embodiment, the upper bound $t_H$ and lower bound $t_L$ are updated during execution of the transaction. The upper and lower timestamp bounds capture the allowable timestamp imprecision. The initial value for $t_H$ is infinity.

Impact of Time Requests

Referring to FIG. 9, when a transaction in an SQL-compliant database requests the current time $t_{current}$, it is possible to request the time with a designated precision P. For example, if the transaction asks for CURRENT DATE, only the day is provided. If CURRENT TIME or CURRENT TIMESTAMP is requested, the user specifies a precision. Whatever precision is requested, an upper and lower bound is provided. The result of a current-time request is the time on the system clock, truncated to the specified precision. Referring to FIG. 9, the upper end and lower timestamp bounds $t_H$, $t_L$ are set 83 based on the precision P and the maximum precision of time M in the exemplary embodiment. The lower bound $t_L$ for the transaction timestamp is the system clock time extended by '0' bits to the maximum time precision M, provided the lower bound provided by the system clock is greater than the previous lower bound for the transaction timestamp ($t_L$=max($t_L$,[P]($t_{cur}$))) where [P] ($t_{cur}$) yields the first P binary digits after $t_{cur}$). The upper bound $t_H$ is the time returned by the system clock extended by '1' bits to the maximum time precision, provided the upper bound provided by the system clock is less than the previous upper bound for the transaction timestamp. An approximation of a time calculation for the upper bound $t_H$ is given by the expression: $t_H$=min ($t_H$, [P] ($t_{cur}$)concatenation with [M-P] ('1'B'S) where [P][$t_{cur}$] yields the first P binary digits of $t_{cur}$ [M-P]('1'B'S) yields M-P binary '1'B digits For example, if CURRENT DATE is requested the timestamp upper bound $t_H$ becomes the last time instant of the day (at maximum precision) for the day that is returned by the system clock. The lower bound constraint provided by this time request is the first instant of the day returned by the system clock. When CURRENT TIME or CURRENT TIMESTAMP are requested at less than maximum precision, similar upper and lower transaction timestamp limits are also set.

In one embodiment of the disclosed method, a timestamp range is assigned 90, 92 with upper and lower bounds as just described, instead of assigning a fully precise timestamp during timestamp assignment. After timestamp range assignment, a transaction continues to access data, via reading and writing and the timestamp limits are incrementally adjusted. As previously noted, the disclosed method aborts transactions that cannot satisfy the timestamp constraints, expressed as bounds on the timestamp. Referring to FIG. 9, transaction aborts 94 whenever the lower bound is greater than the upper bound. ($t_L \geq t_H$).

Committing with Timestamp Ranges

Referring to FIG. 10, the disclosed method chooses a transaction's timestamp, if not yet specified with full precision, to be one unit larger at the finest precision available than the lower bound of the timestamp range, denoted $t_L^+$. (Set $t_X=t_L^+$, the smallest time >$t_L$) for the transaction. The selection of $t_L^+$ as the transaction's timestamp is acceptable and makes it easier for other transactions to select an acceptable timestamp, as the value of the timestamp $t_X$ is minimized. The selection of a timestamp that is as low as possible permits subsequent transactions that read or write data that is read or written by the present transaction, to preserve somewhat larger timestamp ranges. Larger timestamp ranges for future transactions increases the probability that future transactions will escape timestamp induced aborts.

When a transaction X is a distributed transaction, one embodiment of the disclosed method uses a timestamping commit protocol to determine a transaction timestamp for all transaction participants. Each transaction participant has a transaction timestamp range within which the participant guarantees that it can commit. A transaction coordinator intersects all acceptable transaction timestamp ranges, and then chooses a time within that range as the timestamp $t_X$ for the transaction. Normally the timestamp $t_X$ will again be set to one unit higher than the timestamp lower limit $t_L^+$.

Read Timestamps

Read timestamps d.$T^R$ are only needed for the timestamp assignment process, and can be dispensed with once their role in the timestamp assignment process is completed.

The disclosed method utilizes a technique for managing read timestamps d.$T^R$ that is simple to implement, has high performance, and minimizes aborts. The disclosed technique for managing read timestamps d.$T^R$ is more flexible than the LAST technique and requires lower overhead than the timestamp order concurrency control approach, which were discussed in the background.

Read Timestamp Table (RTT) Approach

The disclosed method conservatively enforces the requirement that timestamp order be consistent with read-write conflict order. In the exemplary embodiment of the invention, read timestamps d.$T^R$ values are provided via a hash table, hereinafter referred to as a Read Timestamp Table RTT. It should be readily apparent to those skilled in the art that a table other than a hash table can be used as the read timestamp table. Each entry of the read timestamp table RTT determines a read timestamp $d.T^R$ value for a set of data items D that hash to that location of the read timestamp table RTT. In the exemplary embodiment, the disclosed method maps a set of data items via a hash function to an identifier ID for the set of data items D. (hash(d)=ID). The identifier ID is then used to access the an entry in the read timestamp table RTT and determine the common read timestamp $d.T^R$ value for all of the data items d that make up the set of data items D. (RTT(hash(d)). Multiple data items that map to the same ID share the same read timestamp.

The read timestamp table's size can be varied depending upon the desired trade-off between storage overhead and abort rate. A larger read timestamp table results in smaller sets D of data that are coalesced and managed with the same read timestamp value $d.T^R$ from a location in the read timestamp table RTT.

Each data item d that a transaction X writes is checked to ensure that the read-write conflict order between the transaction X and earlier read transactions agrees with the timestamp order of the transactions. Hence, transaction writes require the read timestamp table RTT to be checked.

Each data item d that a transaction X reads requires the read timestamp table RTT be updated to ensure that the read-write conflict order between transaction X and subsequent write transactions agrees with the timestamp order.

The read timestamp table RTT cannot be updated until the transaction X has been given a timestamp $t_X$. While transaction X is executing locking ensures serializability of transactions. Transaction atomicity ensures that as late as commit time timestamp order can be enforced by transaction abort if necessary.

Read Timestamp Table Updating at Commit Time

Referring to FIG. 10, the read timestamp table RTT is updated at commit time of a transaction. The disclosed method performs appropriate read timestamp updating of the read timestamp table RTT at commit time. To update the read timestamp table at commit time, the disclosed method remembers the hash values (i=hash(d)) for all data items d that are read by the transaction. The set $V_R$ of data items d read by the transaction is a second bit vector. The set $V_R$ of data items read by the transaction may be 64 bytes (representing 512 bits and hence a table of 512 entries, illustrating that the overhead required by the disclosed method need not be large.

For data items read, each read timestamp entry RTT[i] in which the bit vector $V_R$[i]='1'b is accessed at commit time and the read timestamp $d.T^R$ stored in the entry RTT[i] compared to the transaction's timestamp $t_X$. If any of the read timestamps $d.T^R$ stored in the read timestamp table entries RTT[i] corresponding to the data items read by the transaction are less than the transaction timestamp $t_X$, the read timestamps $d.T^R$ stored in the read timestamp table entries RTT[i] are updated to the transaction timestamp. (If $V_R$[i]='1'b, then RTT[i]←tX.)

It is possible to update entries in read timestamp table RTT as soon as a transaction has a timestamp. However, in the exemplary embodiment, the disclosed method does not update the read timestamp table RTT earlier than commit time. Read locks prevent subsequent writers from writing any read data item d, so there is no possibility of a timestamp order violation involving a read data item d until after a transaction commits. An early update of the read timestamp table entry RTT[hash(d)] will increase the number of false timestamp order violations, because the timestamp associated with the read timestamp table entry RTT[hash(d)] will associate the later timestamp of data item d with all data items in the set D of data items that hash to read timestamp table entry RTT[hash(d)].

Time for Checking the Read Timestamp Table

As noted above, the entries of the read timestamp table are incrementally checked for each data item inserted or deleted by the transaction. In the exemplary embodiment, the disclosed method checks the read timestamp table RTT as early as possible, i.e. when each data item is written. For example, when transaction X writes data item d transaction X's write lock prevents any subsequent reader from reading data item d. A precise read timestamp $d.T^R$ cannot increase in value for the duration of the transaction. However, the value of read timestamp table entry RTT[hash(d)] can be updated because some other transaction may read a data item d' that hashes to the same timestamp table entry RTT[hash(d)] as data item d. (hash(d')=hash(d)). This might lead to an unnecessary abort of transaction X.

By checking the read timestamp table entries RTT[hash(d)] as early as possible, the disclosed method reduces the window in which a data item d' from another transaction can update the RTT entry that data item d hashes to. In the exemplary embodiment, when there is a write of a data item d', the disclosed method checks the read timestamp table entry RTT[hash(d')] immediately. The result of this check is to update the lower bound constraint $t_L$ of the transaction. A comparison of the updated $t_L$ to possible transaction upper bound $t_H$ detects when transactions cannot satisfy the timestamping constraints. The early check of data items identifies transactions that need to be aborted as early as possible, resulting in less wasted work done by a doomed transaction.

Impact of System Crashes on Read Timestamps

In the disclosed method, the read timestamp table RTT is used only to help choose the timestamps of transactions and determine aborts. The disclosed read timestamp table RTT does not need to be stable (i.e. it does not need to persist across system crashes) as long as the latest possible timestamp LAST used by any committed transaction prior to the crash can be identified. In the disclosed method, the latest possible timestamp LAST is available in the recovery log.

In the disclosed method, transactions that are active at the time of a crash are aborted, so the activities of these transactions have no effect. When a crashed system is restarted, the disclosed method initializes all entries of the read timestamp table RTT to the latest possible timestamp LAST that was committed prior to the crash. This approach is conservative, since pre-crash read timestamp table RTT entries might have had earlier timestamps. However, no additional local transactions will be aborted by this process, since all post-crash local transactions will have timestamps $t_X$ greater than the latest possible timestamp LAST before the crash.

The disclosed method sets the entries of the read timestamp table RTT to the latest possible timestamp LAST, rather than setting the entries of the read timestamp table to a fixed value, such as zero, because some non-local distributed transactions may have timestamps earlier than the latest possible timestamp before the crash LAST. Using the latest possible timestamp LAST guarantees that read-write order violations for these distributed transactions are prevented. Use of a fixed value, such as zero, does not guarantee that read-write order violations will be prevented. Distributed transactions may be aborted because the assigned read timestamps are later than they might otherwise have been if a system crash had not occurred. Thus, a local cohort of a distributed transaction would have the latest possible timestamp LAST as a lower bound on its commit time. A distributed transaction X may, at another of its cohorts, be forced to choose a timestamp upper limit $t_H$ that is less than the latest possible timestamp LAST, because of a CURRENT TIME request by the cohort, resulting in the transaction being aborted. However, the probability is low that a distributed transaction will be aborted due to conflicts between cohorts after a system crash.

Handling of Write Timestamps

Write timestamps d.TT⊦are stored with each data item d, denoting the time at which each data item d is inserted. Transaction-time databases also store an end time d.TT⊦for the data items in the database, denoting the time at which the data item is deleted. A write transaction posts both new data values and the start and end timestamps. Since the transaction's timestamp may not be established when the write occurs, the disclosed method records the writes in some other way, and completes the writes when sufficient information is available, i.e. when a timestamp is assigned to the transaction.

In one embodiment, an intentions list is created of inserted or deleted data items that records both the identities and values of the items each transaction X writes. The transaction writes remembered in the intentions list are then posted when the timestamp is assigned.

In the exemplary embodiment, an update in the appropriate database page is posted at the time of the write. The two phase locking protocol protects these uncommitted writes, which are not yet timestamped. Since a timestamp is not necessarily assigned to a transaction X in the transaction's execution (i.e. before commit time), the data items written by a transaction are initially tagged with the transaction's transaction id when the write occurs. The disclosed method re-visits these data when a timestamp is assigned to the transaction X.

The transaction's timestamp $t_X$ may not be known until the transaction commits. For a distributed transaction, it may not be possible to choose a timestamp prior to execution of the commit protocol when all transaction cohorts vote on commit and, in one embodiment, on transaction time. The disclosed method re-visits the data items written by a committing transaction X after the transaction commits, when the transaction has been assigned a timestamp $t_X$. The timestamp $t_X$ is placed in the transaction's commit record to ensure that the connection between the transaction id and timestamp is stable. The data items inserted or deleted are re-visited, and the transaction id is replaced by the timestamp $t_X$. In the normal course of system operation, pages containing these records find their way to the disk and become stable.

In the disclosed embodiment, timestamps are posted to written data items after transaction commit. Posting timestamps to written data items after commit causes all data items d to be accessed once to post the write and again, after commit, to post the transaction timestamp that overwrites the transaction id.

The timestamp $t_X$ of the writing transaction is used as the start time TT⊦value for a new data item d' when an insertion occurs, with the end time TT⊦set to the variable now. The timestamp for the writing transaction is used as end time TT value when an existing data item is being deleted. An update is accomplished by two writes. The first write deletes the existing data item d. The second write inserts the new data item d'. The disclosed method maintains the set of inserted items $V_I$ and deleted items $V_D$ to enable the write timestamps of the data written by the transaction to be processed at commit time.

Impact of System Crashes on Write Timestamps

In the disclosed method, write timestamps are permanently assigned to the data written by every committed transaction, as required for a transaction-time database. System crashes can interfere with the process of associating timestamps with data. The disclosed method ensures that the timestamps that are needed in order to support the desired transaction-time database functionality after a crash, survive the crash. The method identifies timestamps that are no longer needed, and justifies that the timestamps are no longer needed. In one embodiment, a transaction's timestamp is stored in the transaction's commit record.

In one embodiment, a persistent table maps committed transaction id's to their corresponding timestamps, referred to as the timestamp table TST. The timestamp table TST contains the timestamps for all transactions. When an unstamped data item is read, the timestamp table TST is consulted and the transaction id is replaced with the timestamp found in the timestamp table TST. The timestamp table TST can get very large, and accessing the timestamp table TST can add to disk I/O.

In a second embodiment, a persistent table also maps committed transaction id's to as timestamp table TST. Only the transaction entries needed for unstamped data are maintained in the timestamp table TST. Entries for which timestamping is complete are garbage collected. The system maintains information about unstamped data to know what timestamp table TST entries to keep or purge.

Garbage Collecting Timestamp Table Entries

In the exemplary embodiment, the identity of each unstamped data item d is maintained in a list associated with the timestamp that is needed by the data item d. As data items are timestamped, they are removed from the list. The disclosed method ensures that the bookkeeping information is persistent. An advantage of retaining the list of data items is that the data items d can be timestamped and the associated timestamp entry can be removed from the timestamp table TST at any time.

In one embodiment, a slightly larger timestamp table TST is used. In this embodiment, the list of items is replaced with a count of the objects that remain to be timestamped (a persistent reference count). When a page is written to disk, a log record that describes the write and its impact on timestamp counts is created. The log record contains, for each timestamp, the number of previously unstamped data items in the page that were given that timestamp. In this manner, the disclosed method can (almost always) persistently maintain counts of the unstamped data for each timestamp. If a crash occurs between the write of a page and the write of the log record describing the write, some timestamp entries in the timestamp table TST are not garbage collected.

In one embodiment, this persistent reference counting is made precise by writing to the log an intention to write pages in a "system transaction" start log record, then writing the pages, and finally committing this "system transaction" after all listed pages are stable on the disk. The changes in reference counts for unstamped data in the start log record would be included with the list of pages being written and the transaction would be redone if the system were to crash.

Computer System

With reference to FIG. 1 an exemplary data processing system for practicing the disclosed data mining engine invention includes a general purpose computing device in the form of a conventional computer 20, including one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

While the present invention has been described with a degree of particularity, it is the intent that the invention include all modifications and alterations from the disclosed implementations falling within the spirit or scope of the appended claims.

What is claimed is:

1. For use with a temporal database, a method of processing multiple transactions that read and write data in the database, comprising:

a) setting a transaction timestamp lower limit when a data item is read to the larger of a time the data item was written and a current timestamp lower limit;

b) setting the transaction timestamp lower limit when a data item is written to the largest of a time the data item was previously written, a time the data item was last read, and the current timestamp lower limit;

c) setting the transaction timestamp lower limit when a time interval is requested by a transaction to the larger of the current lower limit and a start of a time interval requested;

d) setting a transaction timestamp upper limit when a time interval is requested by a transaction to the smaller of a current upper limit and a end of the time interval requested; and e) assigning a transaction timestamp to a value between said transaction timestamp lower limit and said transaction timestamp upper limit.

2. The method of claim 1 further comprising aborting a transaction when the timestamp lower limit is greater than or equal to the timestamp upper limit.

3. The method of claim 1 further comprising restricting write access to a data item when the data item is being read by a transaction and restricting read and write access to a data item when the data item is being written by the transaction.

4. The method of claim 1 further comprising determining whether a time interval has been requested by the transaction and setting the timestamp upper limit to a finite value only when a time interval has been requested by the transaction.

5. The method of claim 1 further comprising storing a list of all data items read by a transaction, storing a list of all data items inserted by a transaction, and storing a list of all data items deleted by a transaction.

6. The method of claim 5 further comprising comparing the transaction timestamp to the time each data item read by the transaction was last written and aborting the transaction when the transaction timestamp is less than the time the transaction was last written.

7. The method of claim 5 further comprising comparing the transaction timestamp to the time each data item written by the transaction was last written and aborting the transaction when the transaction timestamp is less than the time the transaction was last written.

8. The method of claim 5 further comprising comparing the transaction timestamp to the time each data item written by the transaction was last read and aborting the transaction when the transaction timestamp is less than the time the transaction was last read.

9. The method of claim 5 further comprising storing last read values for data items in a hash table, comparing a last read value in the hash table associated with each data item written by the transaction with the transaction timestamp and aborting the transaction when a last read value associated with a data item written is greater than the transaction timestamp.

10. The method of claim 1 further comprising storing last read values in a hash table and accessing the hash table to assign a conservative time a data item was last read to set the lower transaction limit when a data item is written.

11. The method of claim 1 wherein read timestamps are assigned to corresponding sets of data items by applying a hash function to data items.

12. For use with a temporal database, a method of processing multiple transactions that read and write data in the database, comprising:
   a) determining whether a time interval has been requested by a transaction;
   b) setting a transaction timestamp lower limit when a data item is read to the larger of a time the data item was last written and a previous timestamp lower limit;
   c) setting the transaction timestamp lower limit when a data item is written to the largest of a time the data item was previously written, a time the data item was last read, and the previous timestamp lower limit;
   d) assigning a transaction timestamp to a value that is greater than the timestamp lower limit when it is determined that a time interval has not been requested by the transaction;
   e) setting a transaction timestamp upper limit corresponding to an end of the time interval requested by a transaction;
   f) setting a transaction timestamp lower limit which is the larger of the current timestamp lower limit and a start of the interval requested by a transaction; and,
   g) assigning a transaction timestamp a value that is greater than the timestamp lower limit and less than or equal to the timestamp upper limit when it is determined that a time interval has been requested by the transaction.

13. The method of claim 12 wherein the time interval requested by the transaction is the result of a SQL CURRENTTIME request.

14. The method of claim 12 further comprising aborting a transaction when the timestamp lower limit is greater than or equal to the timestamp upper limit.

15. The method of claim 12 further comprising restricting write access to a data item when the data item is being read by a transaction and restricting read and write access to a data item when the data item is being written by the transaction.

16. The method of claim 15 further comprising comparing the transaction timestamp to the time each data item written by the transaction was last read and aborting the transaction when the transaction timestamp is less than the time the transaction was last read.

17. The method of claim 12 further comprising storing a list of all data items read by a transaction and storing a list of all data items written by a transaction.

18. The method of claim 17 further comprising comparing the transaction timestamp to the time each data item read by the transaction was last written and aborting the transaction when the transaction timestamp is less than the time the transaction was last written.

19. The method of claim 17 further comprising comparing the transaction timestamp to the time each data item written by the transaction was last written and aborting the transaction when the transaction timestamp is less than the time the transaction was last written.

20. The method of claim 17 further comprising storing last read values for data items in a hash table, comparing a last read value in the hash table associated with each data item written by the transaction with the transaction timestamp and aborting the transaction when a last read value associated with a data item written is greater than the transaction timestamp.

21. The method of claim 12 further comprising storing last read values in a hash table and accessing the hash table to assign a conservative time a data item was last read to set the lower transaction limit when a data item is written.

22. For use with a temporal database, a method of processing multiple transactions that read and write data in the database, comprising:
   a) assigning read timestamps to corresponding sets of data items;
   b) setting a transaction timestamp lower limit when a data item is read to the larger of a time the data item was written and a previous timestamp lower limit;
   c) setting the transaction timestamp lower limit when a data item is written to the largest of a time the data item was previously written, a read timestamp assigned to a set of data items corresponding to the data item being written, and the previous timestamp lower limit;
   d) setting a transaction timestamp to a value that is greater than the timestamp lower limit.

23. The method of claim 22 wherein the read timestamps are assigned to corresponding sets of data items by applying a hash function to data items.

24. The method of claim 22 further comprising restricting write access to a data item when the data item is being read by a transaction and restricting read and write access to a data item when the data item is being written by the transaction.

25. The method of claim 22 further comprising determining whether a time interval has been requested by the transaction and setting a timestamp upper limit when a time interval has been requested by the transaction.

26. The method of claim 22 further comprising storing a list of all data items read by a transaction and storing a list of all data items written by a transaction.

27. The method of claim 26 further comprising comparing the transaction timestamp to the time each data item read by the transaction was last written and aborting the transaction when the transaction timestamp is less than the time the transaction was last written.

28. The method of claim 26 further comprising comparing the transaction timestamp to the time each data item written by the transaction was last written and aborting the transaction when the transaction timestamp is less than the time the transaction was last written.

29. The method of claim 26 further comprising comparing the transaction timestamp to the time each data item written by the transaction was last read and aborting the transaction when the transaction timestamp is less than the time the transaction was last read.

30. The method of claim 26 further comprising storing read timestamps for data items in a hash table, comparing the read timestamps in the hash table associated with each data item written by the transaction to the transaction timestamp and aborting the transaction when a last read value associated with a data item written is greater than the transaction timestamp.

31. The method of claim 22 further comprising storing the read timestamps in a hash table and accessing the hash table to assign a conservative time a data item was last read to set the lower transaction limit when a data item is written by the transaction.

32. For use with a temporal database, a method of processing multiple transactions that read and write data in the database, comprising:
   a) storing read times in entries of a table that correspond to sets of data items;
   b) assigning a transaction timestamp to a transaction;
   c) storing a list of all data items read by the transaction;
   d) accessing entries in said table that correspond to each data item read by said transaction; and
   e) updating the read time of each accessed entry of the table to the transaction timestamp when the transaction timestamp is greater than the read time stored in the entry of the table.

33. The method of claim 32 wherein sets of data items are assigned to each entry of the table by a hash function.

34. The method of claim 32 further comprising restricting write access to a data item when the data item is being read by a transaction and restricting read and write access to a data item when the data item is being written by the transaction.

35. For use with a temporal database, a method of processing multiple transactions that read and write data in the database, comprising:
   a) restricting write access to a data item when the data item is being read by a transaction;
   b) restricting read and write access to a data item when a data item is being written by the transaction;
   c) determining whether a time interval has been requested by the transaction;
   d) assigning read timestamps to corresponding sets of data items;
   e) storing said read timestamps in a read timestamp table;
   f) setting a transaction timestamp lower limit when a data item is read to the larger of a time the data item was written and a previous timestamp lower limit;
   g) setting the transaction timestamp lower limit when a data item is written to the largest of a time the data item was previously written, a read timestamp stored in the read timestamp table corresponding to the data item being written, and the previous timestamp lower limit;
   h) setting a transaction timestamp upper limit corresponding to an end of the time interval requested by the transaction when it is determined that a time interval has been requested by the transaction;
   i) assigning the transaction timestamp a value between said transaction timestamp lower limit and said transaction timestamp upper limit;
   j) storing in memory a list of each data item read by the transaction;
   k) storing in memory a list of each data item inserted by the transaction;
   l) storing in memory a list of each data item deleted by the transaction;
   m) comparing the transaction timestamp to the time the data item was written for each read, inserted and deleted data item;
   n) aborting the transaction when the time a data item written is greater than the transaction timestamp;
   o) comparing the transaction timestamp to a value in the read timestamp table that corresponds to each inserted and deleted data item;
   p) aborting the transaction when the value in the read timestamp table that corresponds to the inserted and deleted data items is greater than the transaction timestamp;
   q) committing the transaction; and
   r) setting the read timestamps in the read timestamp table for the corresponding sets of data items to the greater of the transaction timestamp and a previous read timestamp for each data item read.

36. The method of claim 35 wherein the read timestamps are stored in storage locations of a hash table and a hash function determines the read timestamp assigned to each set of data items.

37. The method of claim 36 wherein the hash table is accessed to set the transaction timestamp lower limit when a data item is written.

38. The method of claim 36 wherein the transaction timestamp is compared to a value in the hash table that corresponds to each inserted and deleted data item.

39. The method of claim 36 wherein the read timestamps stored in the hash table are set to the greater of the transaction timestamp and the previous read timestamp stored in the storage location for each data item read.

40. A method for use with a temporal database during execution of transactions over the database wherein a given transaction may both read and write data within the database comprising:
   a) setting an initial transaction timestamp lower limit;
   b) during a first phase of transaction execution, updating said lower limit based on reading and writing of data so that:
      i) if data is being read, updating the time stamp lower limit to a time at least as large as the time the data was written, and
      ii) if data is being written, updating the time stamp lower limit to a time at least as large as the time the data was previously written or updating the time stamp lower limit to a time as large as the time the data was read;
   c) during a second phase of transaction execution, after a request for a current time is processed, evaluating said lower limit based on reading and writing of data so that:
      i) if data is being read, and the lower limit is less than the time the data was last written aborting the transaction,
      ii) if data is being written, and the lower limit is less than the time the data was previously written or the lower limit is less than the time the data was read, aborting the transaction; and
   d) committing the transaction by finalizing the reading and writing of data to the database unless the transaction aborted during the second phase of transaction execution.

41. The method of claim 40 wherein the committing of the transaction assigns a read time stamp to data read by the transaction as the lower limit and wherein a write time stamp is assigned to the data written by the transaction is set to the lower limit.

42. The method of claim 41 wherein the read time stamp of data read by the transaction is stored in a memory wherein multiple database data records share a memory location for said read time stamps.

43. The method of claim 42 wherein a storage location for a read time stamp is determined by a function that maps multiple data records to a single memory location.

44. The method of claim 43 wherein the function is a hash function that points to a hash storage table.

45. The method of claim 44 wherein a hash table is set up for each data table of the temporal database and wherein the hash function determines a storage location within its hash table based upon a key value in the temporal database table.

46. The method of claim 40 wherein the request for current time is accompanied by establishing an upper limit and wherein the transaction aborts if thelower limit exceeds the upper limit.

* * * * *